(12) United States Patent
Carnevali

(10) Patent No.: US 9,253,970 B2
(45) Date of Patent: Feb. 9, 2016

(54) MULTI-FUNCTIONAL PORTABLE FISHING ACCESSORY

(71) Applicant: Jeffrey D. Carnevali, Seattle, WA (US)

(72) Inventor: Jeffrey D. Carnevali, Seattle, WA (US)

(*) Notice: Subject to any disclaimer, the term of this patent is extended or adjusted under 35 U.S.C. 154(b) by 171 days.

(21) Appl. No.: 14/270,247

(22) Filed: May 5, 2014

(65) Prior Publication Data

US 2015/0313201 A1 Nov. 5, 2015

(51) Int. Cl.
*A01K 97/04* (2006.01)
*A01K 97/22* (2006.01)
*H01F 7/02* (2006.01)
*H01F 1/053* (2006.01)

(52) U.S. Cl.
CPC ............... *A01K 97/22* (2013.01); *H01F 1/053* (2013.01); *H01F 7/0252* (2013.01)

(58) Field of Classification Search
USPC ............................................. 43/54.1, 57.1, 4
See application file for complete search history.

(56) References Cited

U.S. PATENT DOCUMENTS

| 4,744,614 | A | * | 5/1988 | Gombosi | A01K 97/04 206/315.11 |
|---|---|---|---|---|---|
| 6,427,377 | B1 | * | 8/2002 | Kim | A01K 97/06 43/4 |
| 7,997,024 | B2 | * | 8/2011 | Gesik | A01K 97/06 43/54.1 |
| 2006/0048441 | A1 | * | 3/2006 | Sharff | A01K 97/10 43/54.1 |
| 2009/0025417 | A1 | * | 1/2009 | Azzara | A01K 97/00 62/457.1 |
| 2009/0139132 | A1 | * | 6/2009 | Knight | A01K 97/06 43/54.1 |
| 2011/0005121 | A1 | * | 1/2011 | Gelber | A01K 97/06 43/57.1 |

* cited by examiner

*Primary Examiner* — Christopher P Ellis
(74) *Attorney, Agent, or Firm* — Charles J. Rupnick Attorney at Law

(57) ABSTRACT

A portable, multi-functional fishing accessory formed of a rigid plate member having a flat work surface and a side wall formed around a periphery of the work surface, and wherein the work surface is slanted relative to the side wall. The fishing accessory has one or more magnets positioned opposite from the work surface of the plate member and secured thereto. A stanchion mount is adapted to rotatably mount on a cylindrical stanchion for maintaining the plate member in a substantially upright position.

20 Claims, 5 Drawing Sheets

Fig. 2

MULTI-FUNCTIONAL PORTABLE FISHING ACCESSORY

FIELD OF THE INVENTION

The present invention relates to portable fish and game work boards, and in particular to portable fish and game work boards having capacity for securing knives and other tools.

BACKGROUND OF THE INVENTION

Portable fish and game work boards are generally well-known. Some such work boards are illustrated in U.S. Pat. No. 5,609,521, "Bait Cutting Board" issued to Steven E. Allred, et al. on Mar. 11, 1997, which teaches a bait cutting board with a cutout portion on its perimeter to allow attachment of the bait cutting board to a cleat on a boat; U.S. Pat. No. 7,374,479, "Portable Fish, Fowl And Wild Game Work Surface And Cleaning Apparatus" issued to Donald C. Quinney, et al. on May 20, 2008, which teaches a portable work surface that is capable of temporary mounting to a tree or other vertical support; U.S. Pat. No. 7,322,880, "Collapsible Angler Work Station" issued to Christopher G. Babiana, et al. on Jan. 29, 2008, which teaches a collapsible work station. with hinges that rotate and lock in place and a telescoping leg, capped with a thick rubber boot to protect the boat deck; U.S. Pat. No. 7,059,952, "Filleting Assembly And Method Of Using Same" issued to Vince McRoberts on Jun. 13, 2006, which teaches a flexible sheet with a clamp and a tie-down assembly that secure the sheet in place to a variety of different supports; U.S. Pat. No. 6,926,240, "Strap-on Multi-Functional Apparatus With Integral Supports And Work Surface For Use During Fishing, Boating, Camping, Etc." issued to Steve Goeller on Aug. 9, 2005, which teaches a flat horizontal surface with two hinged support panels attached to the underside, three adjustable-length attachment straps, and one or more rod support tubes for detachable attachment to any vertical member such as a pier piling, a bridge structure, or a tree trunk; U.S. Pat. No. 6,200,212, "Fish Cleaning, Bait Station, And Live Well Device" issued to Eldon L. Henry, et al. on Mar. 13, 2001, which teaches a 3-in-1 fish cleaning, bait cutting, and/or live well device that is attachable to the gunwale of a boat with mounting arms that are adjustable for the width and depth of the gunwale, and further includes a cutting board, clamp device to hold fish, and a knife and pliers holder; and U.S. Pat. No. 5,474,494, "Fish Cleaning Apparatus" issued to Ralph W. Sims on Dec. 12, 1995, which teaches a fish cleaning platform having an opening formed therein over the mouth of a container for receiving fish cleaning debris, and telescoping members for securing the platform on different containers having different dimensions of mouths, all of which are incorporated herein by reference.

These and other portable fish and game work boards are complex and are limited in their ability to secure knives and other tools in an efficient and reliable manner.

SUMMARY OF THE INVENTION

The present invention is a present invention is a portable, multi-functional fishing accessory formed of a rigid plate member having a flat work surface and a side wall formed around a periphery of the work surface, and wherein the work surface is optionally slanted relative to the side wall. The fishing accessory has one or more magnets positioned opposite from the work surface of the plate member and secured thereto. A stanchion mount is adapted to rotatably mount on a cylindrical stanchion for maintaining the plate member in a substantially upright position.

According to one aspect of the invention, an exterior portion of the side wall has one or more wedge shaped grooves formed therein.

According to another aspect of the invention, a portion of the plate member adjacent to the magnet is thinner than an adjoining portion thereof.

According to another aspect of the invention, the fishing accessory includes a retainer coupled for retaining the magnet adjacent to the plate member opposite from the work surface. Optionally, a socket is formed on the plate member opposite from the work surface for receiving the magnet therein, and the retainer is coupled for retaining the magnet in the socket. Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

As required, a detailed illustrative embodiment of the present portable, multi-functional fish and game work board is disclosed herein. However, techniques, systems and operating structures in accordance with the present protective enclosure may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present protective enclosure. The following presents a detailed description of an illustrative embodiment (as well as some alternative embodiments) of the present fish and game work board.

In the Figures, like numerals indicate like elements.

Figure 1:
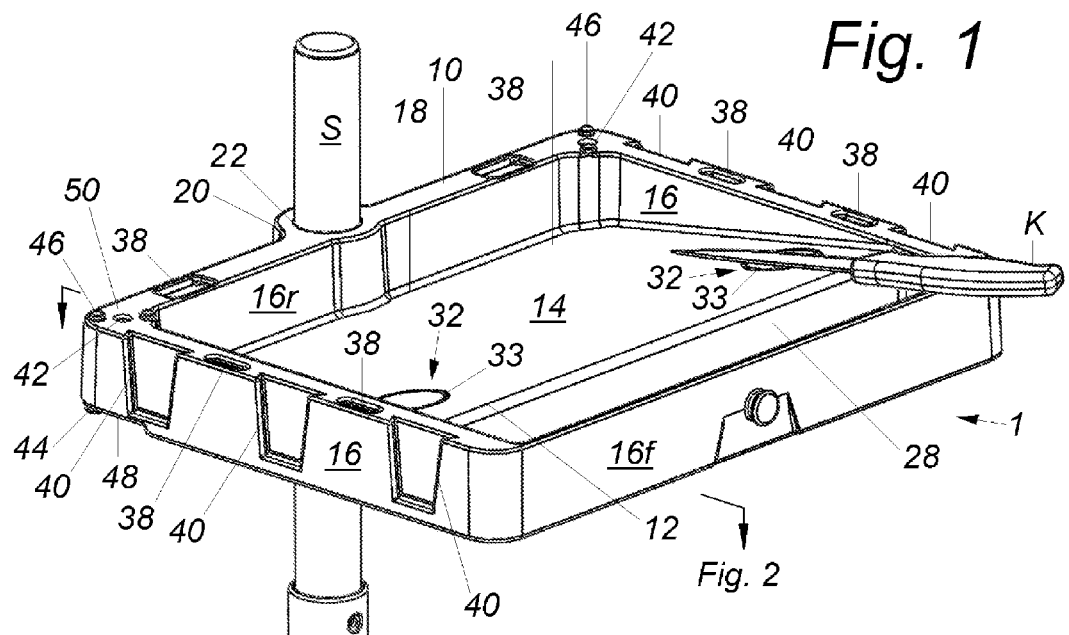
FIG. 1 illustrates the invention embodied by example and without limitation as a portable, multi-functional fish and game work board that is temporarily mounted on a cylindrical pole or stanchion.

FIG. 1 illustrates the invention embodied by example and without limitation as a portable, multi-functional fish and game work board 1 temporarily mounted on a cylindrical pole or stanchion S. Work board 1 formed of a tray 10 formed with a rigid plate member 12 having a flat work surface 14 and a side wall 16 formed around a periphery 18 of work surface 14. Work surface 14 is slanted at an angle a relative to two opposing side walls 16f and 16r.

Figure 2:
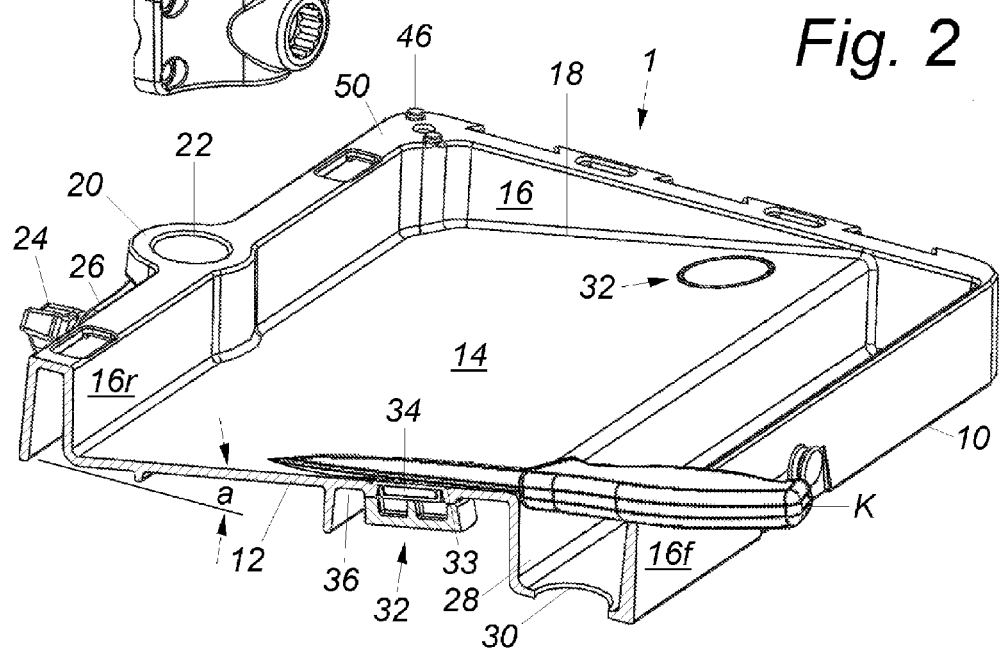
FIG. 2 is a cross-section view of the work board of FIG. 1, wherein the well is depicted being formed with an optional cleaning aperture in a bottom surface thereof.

As illustrated here by example and without limitation, one side wall 16r of tray 10 is further with a stanchion mount 20 that is adapted to rotatably mount on cylindrical stanchion S for maintaining plate member 12 in a substantially upright position. For example, stanchion mount 20 includes a substantially cylindrical split aperture 22 sized to fit loosely about stanchion S so that as to be easily rotatable thereabout. As illustrated in FIG. 2, stanchion mount 20 is formed as a split ring with a clamp 24 adjacent to one end of an arm 26, which permits tightening of clamp 24 to secure stanchion mount 20 on stanchion S. Accordingly, loosening of clamp 24 quickly frees work board 1 to rotate about stanchion S, and simultaneously frees work board 1 for sliding translationally along the length of stanchion S. Tightening of clamp 24 also quickly secures work board 1 rotationally about stanchion S, and simultaneously secures work board 1 translationally along the length of stanchion S.

Flat work surface 14 rigid plate member 12 abuts a well 28 formed adjacent to one side wall 16f. Well 28 operates as a container for items such as floats, jars, and other small items. However, being adjacent to flat work surface 14, well 28 is also operable for capturing fish entrails and other debris when work board 1 is used for cleaning fish. Well 28 optionally includes an aperture 30 formed in the bottom thereof for rinsing or sweeping out fish entrails and other debris for cleaning well 28.

One or more magnetic features 32 are installed under flat work surface 14 of work board 1 for securing knifes, tools and other steel items such as hooks and lures. Work surface 14 may include visual designations 33 of magnetic features 32, such as variations in color, contour or texture of work surface 14. Magnetic features 32 are optionally provided as magnets 34, such as rare earth magnets, mounted to a bottom surface 36 of rigid plate member 12 opposite of work surface 14. Optionally, plate member 12 is formed with a first major thickness T over a majority of its entire expanse, and a second relatively thinner minor thickness t in the vicinity of each magnet 34, whereby magnets 34 are positioned nearer to work surface 14 than bottom surface 36 of plate member 12. Accordingly, ferrous items K such knifes, tools, hooks and lures and other steel items placed on work surface 14 are secured in a convenient position ready to hand.

Additional hanger features 38 and 40 are provided in side walls 16. For example, slot hangers 38 are slots formed through top of side walls 16 for receiving tools such as clippers, pliers and scissors, and wedge hangers 40 are wedge shaped grooves formed in the outer surface of side walls 16 for receiving proprietary holders, such as cup or camera holders. Additional tube hangers 42 may also be provided through top of side walls 16 for receiving long and narrow items such as screw drivers, awls, and similar items.

Stackability is an additional novel feature of work board 1. For example, two or more guides 44 and mating guide pins 46 are provided on opposite bottom surface 48 and top surface 50 of tray 10. Guide pins 46 of a first tray 10 are positioned and sized to mate with guides 44 of a second tray, as disclosed herein.

FIG. 2 is a cross-section view of work board 1, wherein well 28 is depicted being formed with optional cleaning aperture 30 in a bottom surface thereof.

Figure 3:
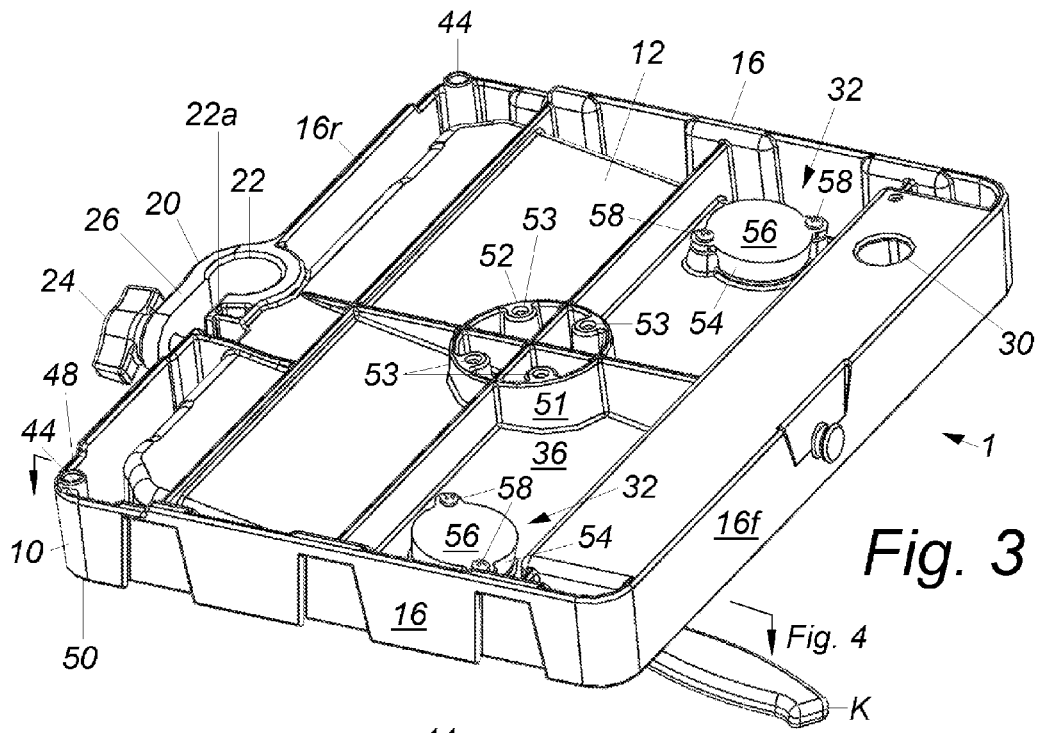
FIG. 3 is a bottom view of the work board of FIG. 1, wherein the aperture of the stanchion mount is formed with a split between an arm and an opposing side wall of the tray, which permits slight loosening and tightening of the aperture by a clamp to secure the stanchion mount on the stanchion, whereby loosening of the clamp quickly frees the work board to rotate about the stanchion, and simultaneously frees the work board for sliding translationally along the length of the stanchion.

FIG. 3 is a bottom view of work board 1, wherein aperture 22 of stanchion mount 20 is formed with a split 22a between arm 26 and opposing side wall 16r, which permits slight loosening and tightening of aperture 22 by clamp 24 to secure stanchion mount 20 on stanchion S. Accordingly, loosening of clamp 24 quickly frees work board 1 to rotate about stanchion S, and simultaneously frees work board 1 for sliding translationally along the length of stanchion S. Tightening of clamp 24 also quickly secures work board 1 rotationally about stanchion S, and simultaneously secures work board 1 translationally along the length of stanchion S.

Figure 4:
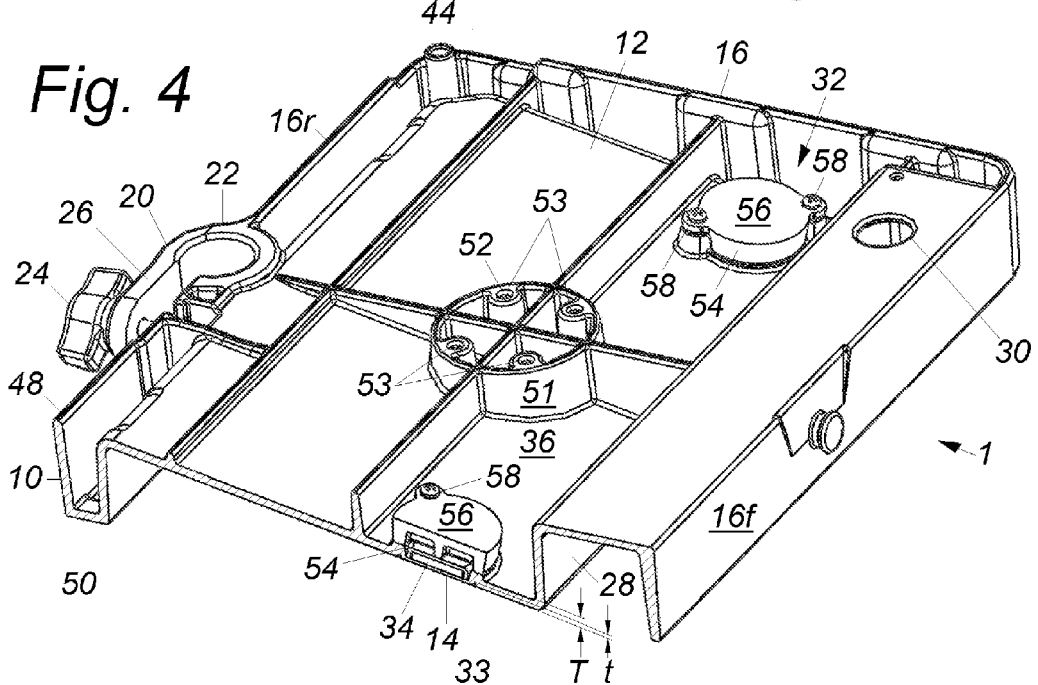
FIG. 4 is a cross-section view of the work board of FIG. 1, wherein the rigid plate member is depicted as having a thinner cross-section thickness in the vicinity of a socket that hold the magnet such that each magnet is positioned closer to the work surface of the work board.

Tray 10 is fitted with an optional mounting structure 52 positioned on bottom surface 36 of rigid plate member 12. For example, optional mounting structure 52, if present, may have a boss 51 with a plurality of mounting holes 53, for example, for receiving fasteners. Here, each of magnetic features 32 is illustrated as having a shallow socket 54 formed on bottom surface 36 of rigid plate member 12 opposite of work surface 14. Socket 54 is covered with a socket lid or other retainer 56 that receives magnet 34 and retains magnet 34 adjacent to bottom surface 36 of rigid plate member 12 opposite of work surface 14, as shown in FIG. 4. Socket lids 56 are held in position over sockets 54 by fasteners or other fastening means 58.

FIG. 4 is a cross-section view of work board 1, wherein rigid plate member 12 is depicted as having a thinner cross-section thickness in the vicinity of sockets 54 such that magnet 34 are positioned closer to work surface 14 thereof. Such closer proximity to work surface 14 increases effective holding power of magnet 34.

Figure 5:
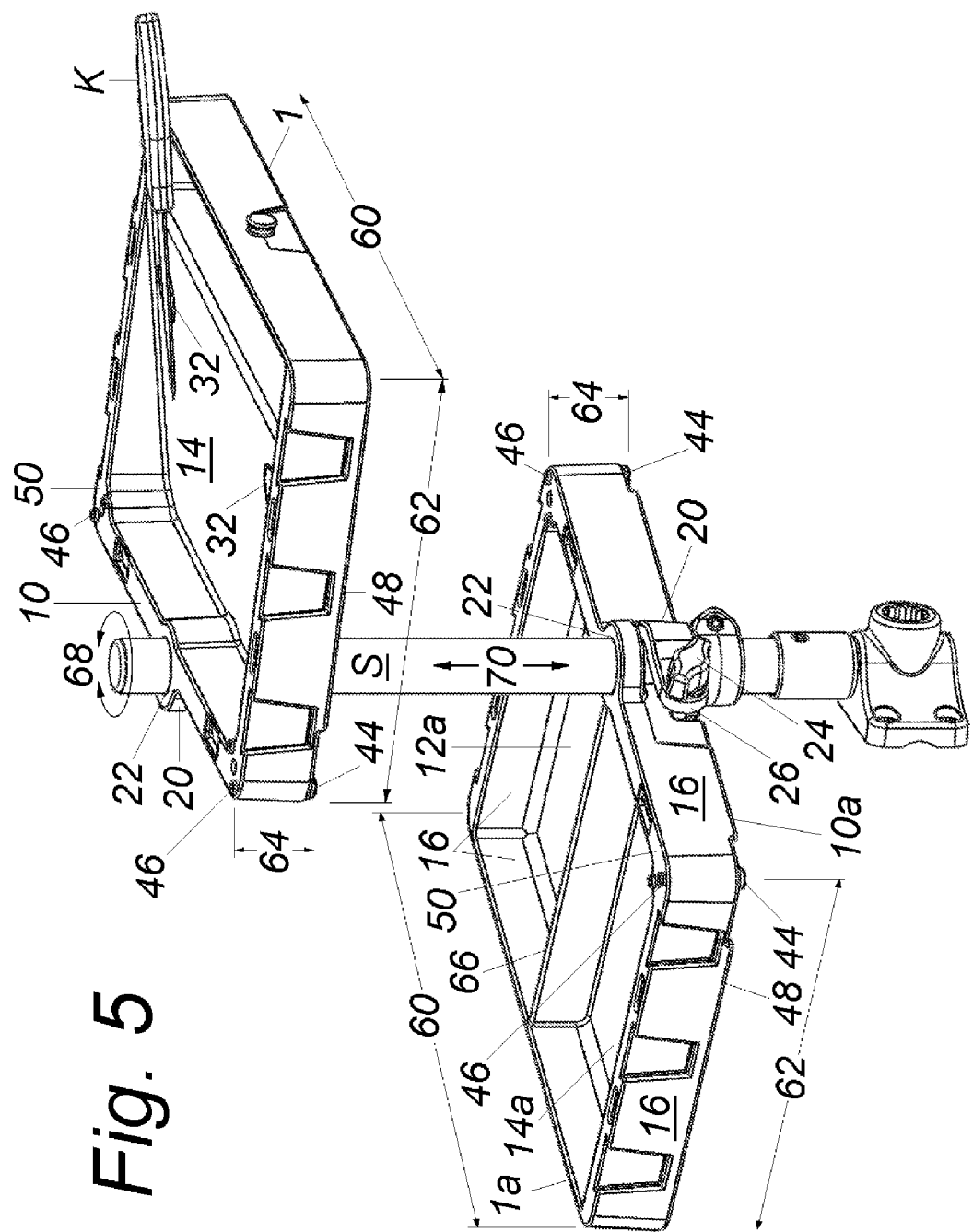
FIG. 5 illustrates two (shown) or more of the work board of FIG. 1 mounted on a single stanchion.

FIG. 5 illustrates two (shown) or more of work boards 1 and 1a mounted on a single stanchion S, wherein work board 1a may be the same as work board 1, or may be different in physical configuration from work board 1 (shown). Here, for example, work board 1a has the same dimensions as work board 1 having a tray 10a formed with the same width dimension 60, depth dimension 62 and height dimension 64. However, work board 1a is formed with a rigid plate member 12a having a flat work surface 14a that is substantially perpendicular to side wall 16. Here, by example and without limitation, work surface 14a is divided, optionally bisected, by an upright wall 66 spanning between two side walls 16. Other configurations of tray 10a are also contemplated and may be substituted without deviating from the scope and intent of the present invention.

Each of work board 1 and work board 1a are formed with two or more of guides 44 and mating guide pins 46 are provided on opposite bottom surface 48 and top surface 50 of respective trays 10 and 10a. Accordingly, work board 1 and work board 1a include the additional novel feature of mutual stackability disclosed herein.

Furthermore, each tray 10, 10a is formed with stanchion mount 20 that is adapted to rotatably mount on cylindrical stanchion S for maintaining plate members 12, 12a in a substantially upright position. Cylindrical apertures 22 of respective stanchion mounts 20 are fitted loosely about stanchion S so that as to be easily rotatable (arrow 68) thereabout. Additionally, loose fit of cylindrical apertures 22 of respective stanchion mounts 20 permits easy translation (arrow 70) along stanchion S. As illustrated in FIG. 2, stanchion mount 20 is formed as a split ring with a clamp 24 adjacent to one end of an arm 26, which permits tightening of clamp 24 to secure stanchion mount 20 on stanchion S. Accordingly, loosening of clamp 24 quickly frees respective work boards 1 and 1a to rotate about stanchion S, and simultaneously frees respective work boards 1 and 1a to slide translationally along the length of stanchion S. Tightening of clamp 24 also quickly secures respective work boards 1 and 1a rotationally about stanchion S, and simultaneously secures respective work boards 1 and 1a translationally along the length of stanchion S.

Figure 6:
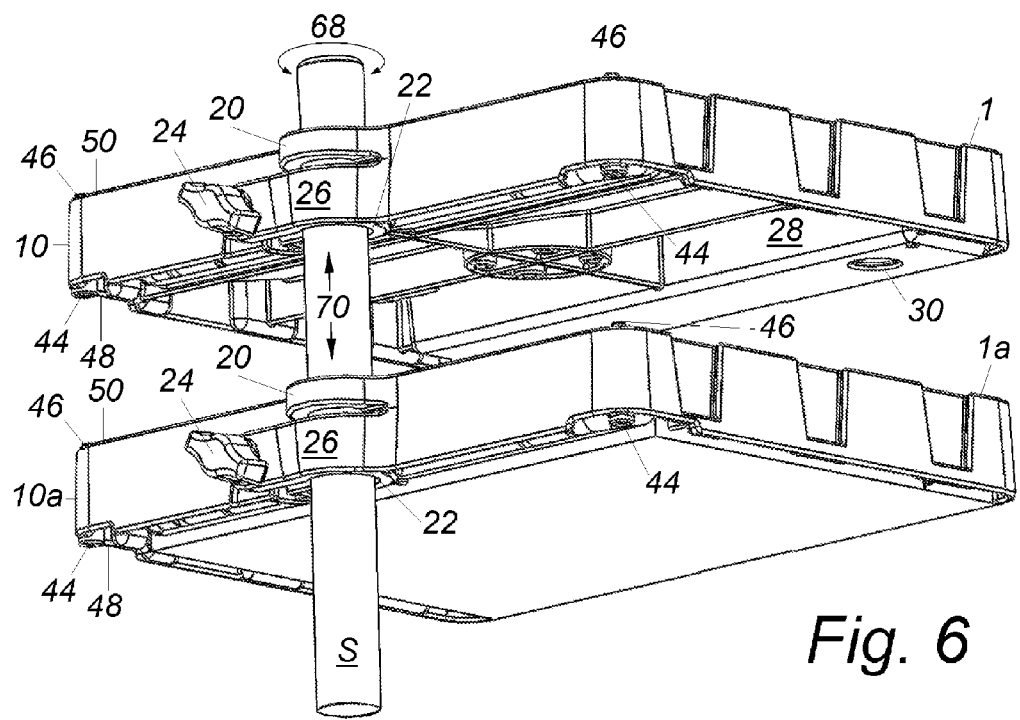
FIG. 6 shows respective trays of the two work boards of FIG. 5 mounted on the single stanchion and being mutually aligned.

FIG. 6 shows respective trays 10, 10a of work boards 1 and 1a being aligned on stanchion S, with guides 44 of work board 1 aligned with mating guide pins 46 of work board 1a.

Figure 7:
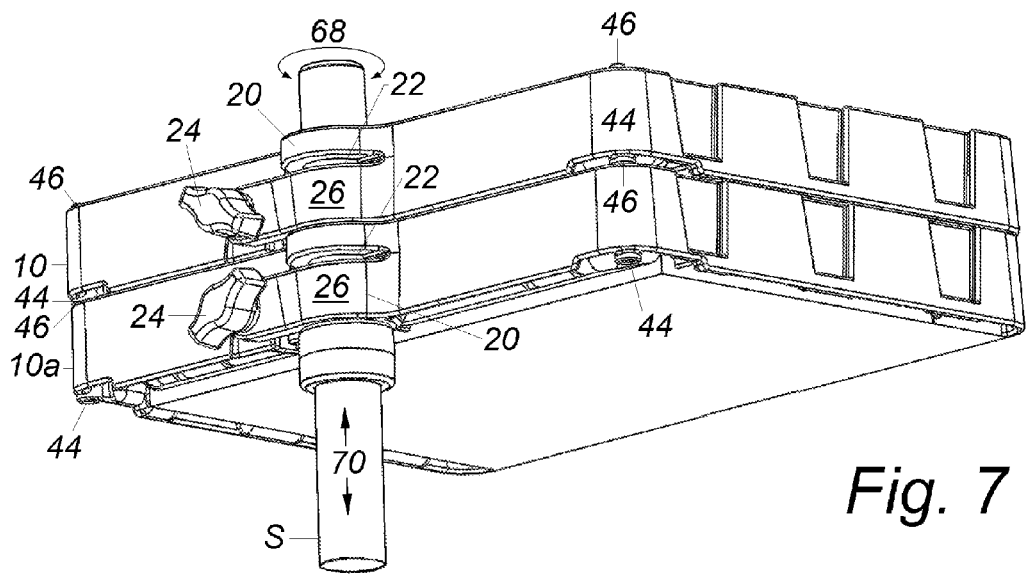
FIG. 7 shows respective trays of the two work boards of FIG. 6 mounted on the single stanchion and being joined together along the stanchion, with guides of the first work board of FIG. 1 being mated with guide pins of the second work board.

FIG. 7 shows respective trays 10, 10a of work boards 1 and 1a being joined together along stanchion S, with guides 44 of work board 1 mated with guide pins 46 of work board 1a.

Figure 8:
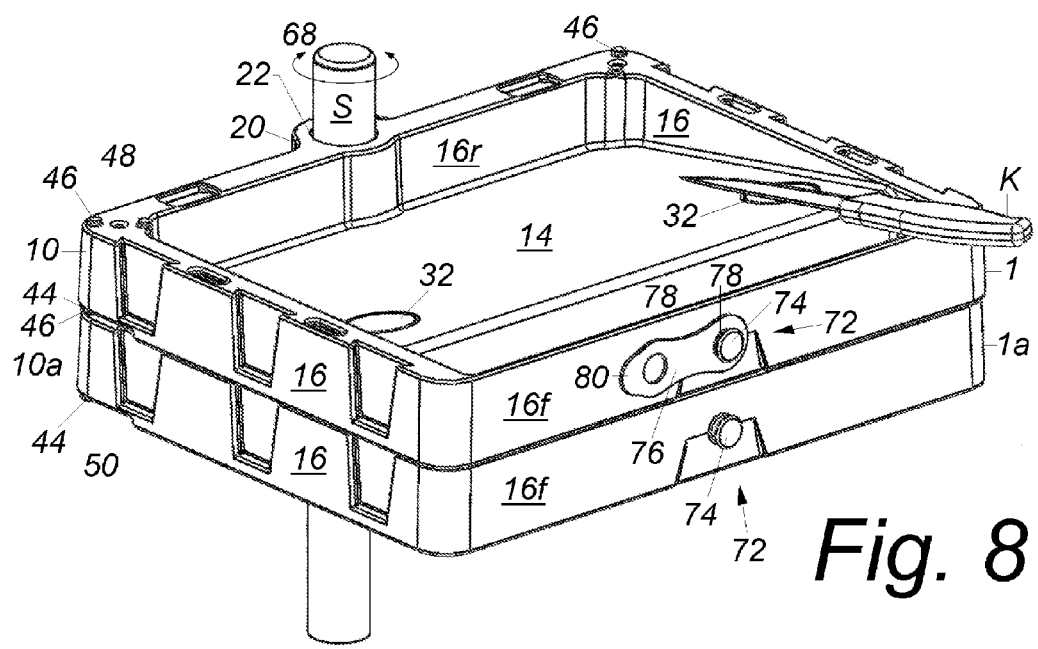
FIG. 8 is a view of the respective trays of the two work boards of FIG. 7 being joined together and showing an opposite side wall of the each trays, wherein each tray includes a means for interlocking with the other tray.

FIG. 8 is a view of the joined together respective trays 10, 10a of work boards 1 and 1a showing side wall 16f of each tray 10, 10a. Here, guides 44 of work board 1 are mated with guide pins 46 of work board 1a. According to one embodiment, each tray 10, 10a includes a means 72 for interlocking with the other tray. Here, interlocking means 72 is embodied as a catch 74 that is compatible with catch 74 of the other tray 10, 10a, and an interconnecting strap 76 is formed with two apertures 78 sized to fit over catches 74. Optionally, interconnecting strap 76 is of a resiliently stretchable material such as rubber or the like. A tab or tongue 80 may be provide adjacent to one end of strap 76 to aid in attaching to and detaching from catches 74.

Figure 9:
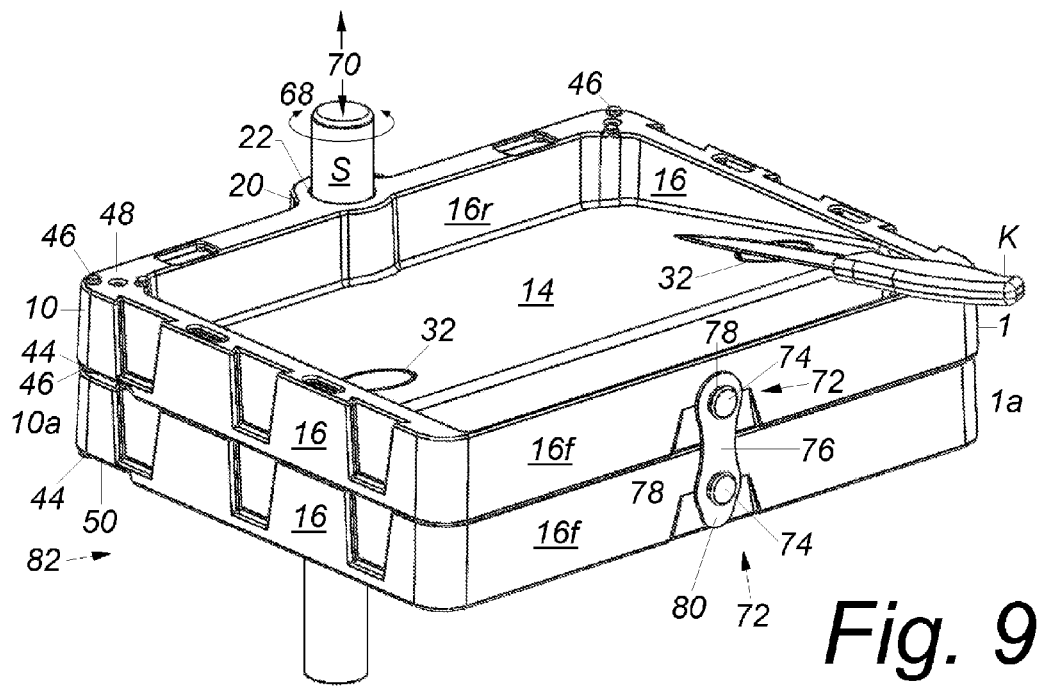
FIG. 9 illustrates the respective trays of the two work boards of FIG. 8 being joined together with the guides of the first work board mated with the guide pins of the work board, and interlocked therewith with an interlocking strap interconnecting catches of the respective trays, whereby the two work boards of FIG. 8 are assembled and interlocked.

FIG. 9 illustrates respective trays 10, 10a of work boards 1 and 1a joined together guides 44 of work board 1 mated with guide pins 46 of work board 1a, interlocked with strap 76 interconnecting catches 74 of respective trays 10, 10a. Thus assembled and interlocked, work boards 1 and 1a together form a box 82 that can be rotated (arrow 68) about stanchion S and translated along the length of stanchion S. Box assembly 82 even can be removed from stanchion S for storage or use elsewhere.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A portable, multi-functional fishing accessory, comprising:
    a plate member having a work surface;
    one or more magnets positioned opposite from the work surface of the plate member; and
    a mount adapted for maintaining the plate member in a substantially horizontal orientation.

2. The fishing accessory of claim 1, wherein the plate member further comprises a plurality of wedge shaped grooves adjacent to a peripheral edge thereof.

3. The fishing accessory of claim 1, further comprising a socket positioned opposite from the work surface of the plate member for receiving the magnet.

4. The fishing accessory of claim 3, further comprising a retainer coupled for retaining the magnet in the socket.

5. The fishing accessory of claim 1, wherein the magnet further comprises a rare earth magnet.

6. The fishing accessory of claim 1, wherein the one or more magnets further comprises a plurality of magnets.

7. The fishing accessory of claim 1, further comprising a side wall substantially surrounding the plate member.

8. A portable, multi-functional fishing accessory, comprising:
    a plate member having a flat work surface and a side wall surrounding the work surface;
    one or more magnets secured to the plate member opposite from the work surface; and
    a mount adapted for mounting the plate member in a substantially horizontal orientation.

9. The fishing accessory of claim 8, wherein the plate member further comprises one or more wedge shaped grooves formed in an exterior portion of the side wall.

10. The fishing accessory of claim 8, wherein the one or more magnets further comprises a plurality of magnets.

11. The fishing accessory of claim 8, wherein the magnet further comprises a rare earth magnet.

12. The fishing accessory of claim 8, wherein the one or more magnets are further secured to the plate member in a socket.

13. The fishing accessory of claim 8, wherein the plate member further comprises a minor thickness adjacent to each magnet that is relatively thinner than a major thickness of the plate member.

14. The fishing accessory of claim 8, wherein the work surface is oriented at a nonperpendicular angle to the side wall.

15. The fishing accessory of claim 14, further comprising a well formed adjacent to the work surface.

16. A portable, multi-functional fishing accessory, comprising:
    a rigid plate member having a flat work surface and a side wall formed around a periphery of the work surface, and wherein the work surface is slanted relative to the side wall;
    one or more magnets positioned opposite from the work surface of the plate member and secured thereto; and
    a means for maintaining the plate member in a substantially horizontal orientation.

17. The fishing accessory of claim 16, wherein an exterior portion of the side wall has one or more wedge shaped grooves formed therein.

18. The fishing accessory of claim 16, wherein a portion of the plate member adjacent to the magnet is thinner than an adjoining portion thereof.

19. The fishing accessory of claim 18, further comprising a retainer coupled for retaining the magnet adjacent to the plate member opposite from the work surface.

20. The fishing accessory of claim 19, further comprising a socket formed on the plate member opposite from the work surface and receiving the magnet therein, the retainer being coupled for retaining the magnet in the socket.

* * * * *